(12) United States Patent
Yuan

(10) Patent No.: US 9,915,547 B2
(45) Date of Patent: Mar. 13, 2018

(54) ENHANCED NAVIGATION INFORMATION TO AID CONFUSED DRIVERS

(71) Applicant: Honda Motor Co., Ltd., Tokyo (JP)

(72) Inventor: Alvin Teh Yuan, Carson, CA (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/075,460

(22) Filed: Mar. 21, 2016

(65) Prior Publication Data
US 2017/0268897 A1 Sep. 21, 2017

(51) Int. Cl.
B60W 40/09 (2012.01)
G01C 21/36 (2006.01)

(52) U.S. Cl.
CPC ......... G01C 21/3641 (2013.01); B60W 40/09 (2013.01)

(58) Field of Classification Search
CPC .................... G01C 21/3641; B60W 40/09
See application file for complete search history.

(56) References Cited

U.S. PATENT DOCUMENTS

| 6,983,203 B1 | 1/2006 | Wako | |
| 8,234,063 B2 | 7/2012 | Dhanani | |
| 8,972,187 B1 | 3/2015 | Steinmetz et al. | |
| 2005/0182564 A1* | 8/2005 | Kim | G01C 21/3644 701/468 |
| 2012/0018989 A1* | 1/2012 | Breed | B60R 21/01516 280/735 |
| 2012/0044091 A1* | 2/2012 | Kim | G08G 1/143 340/932.2 |
| 2014/0358439 A1 | 12/2014 | Jamain et al. | |
| 2015/0345981 A1* | 12/2015 | Goldman-Shenhar | G01C 21/3629 701/533 |

* cited by examiner

Primary Examiner — Michael D Lang
(74) Attorney, Agent, or Firm — Honda Patents & Technologies North America, LLC; Mark E. Duell

(57) ABSTRACT

A method of providing enhanced navigation information in a vehicle in response to a finding of driver confusion includes the steps of monitoring behavior of a driver, determining whether the driver is confused based on the behavior of the driver, and providing additional points of interest data to the driver if the driver is determined to be confused.

19 Claims, 6 Drawing Sheets

ENHANCED NAVIGATION INFORMATION TO AID CONFUSED DRIVERS

TECHNICAL FIELD

The embodiments relate generally to navigation systems for a vehicle and, more particularly, to enhancing the presentation of navigation data to assist a confused driver.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

Today, many motor vehicles include navigation systems display interactive digital maps. Depending on the navigation system and/or user preferences, digital maps may display a variety of map content, such as topographical data, street and road data, urban transit information, traffic data, weather data, etc. Some software applications also provide point of interest (POI) data, such as requests to search for coffee shops in a certain area or requests for directions from a current location to a particular coffee shop, and display search results on the digital map.

While in some locations, such as a crowded urban environment, it may not be possible to display all POI data. However, there may be a time when a driver becomes confused, such as in a unknown city, and the need to provide certain types of POI data, such as parking lots or garages, may override the need to for other types of data displayed by the navigation system.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a computer-implemented method of providing enhanced navigation information in a vehicle in response to a finding of driver confusion includes the steps of monitoring behavior of a driver, determining whether the driver is confused based on the behavior of the driver, and providing additional points of interest data to the driver if the driver is determined to be confused.

According to another aspect, a system for providing enhanced navigation information in a vehicle to a driver in response to a finding of driver confusion, includes a navigation system. The navigation system includes a processor and a screen for displaying navigation information. The vehicle includes a seat belt sensor for monitoring tension of the seat belt and providing driver behavior data to the navigation system, wherein the navigation system determines whether the driver is confused based on the driver behavior data, and wherein the navigation system provides additional points of interest data to the driver if the driver is determined to be confused. The points of interest data includes parking data and sign data for stores and buildings.

According to yet another aspect, a system for providing enhanced navigation information in a vehicle to a driver in response to a finding of driver confusion includes a navigation system. The navigation system includes a processor and a screen for displaying navigation information. The vehicle includes a lane monitoring system for determining whether the vehicle is maintained within a lane in a road and providing driver behavior data to the navigation system, wherein the navigation system determines whether the driver is confused based on the driver behavior data, and wherein the navigation system provides additional points of interest data to the driver if the driver is determined to be confused. The points of interest data includes parking data and sign data for stores and buildings.

According to yet another aspect, a system for providing enhanced navigation information in a vehicle to a driver in response to a finding of driver confusion, includes a navigation system. The navigation system includes a processor and a screen for displaying navigation information. The system includes a forward collision warning system of the vehicle providing driver behavior data to the navigation system, wherein the navigation system determines whether the driver is confused based on the driver behavior data and wherein the navigation system provides additional points of interest data to the driver if the driver is determined to be confused. The points of interest data includes parking data and sign data for stores and buildings.

The figures depict various embodiments of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

A POI information retrieval module monitors a user, such as the driver of a vehicle, to retrieve information related to a point of interest near the vehicle in response to cues that a driver is confused or distressed. A driver detection system, which may include a camera and sensors, sends a data signal representing the driver's state to the POI information retrieval module. The POI information retrieval module performs recognition on the data signal to generate a target region that includes the POI that is likely to help the user. After generating the target region, information about the POI can be retrieved by querying a server-based POI service with the target region or by searching in a micromap that is stored locally. The retrieved POI information can then be provided to the user via a display and/or speaker in the vehicle. This process beneficially allows the vehicle to rapidly identify and retrieve information about a POI near the vehicle and present the POI to the user without the user having to navigate a user interface by manipulating a touchscreen or physical buttons.

The vehicle may optionally detect voice cues or prompts along with detecting driver behavior. If a microphone in the vehicle detects a voice cue, the POI information retrieval module performs voice recognition on the voice cue to generate a character string representing the words that were spoken as part of the command. The character string can then be used to help identify a POI that may assist the user.

Operating Environment

Figure 1:
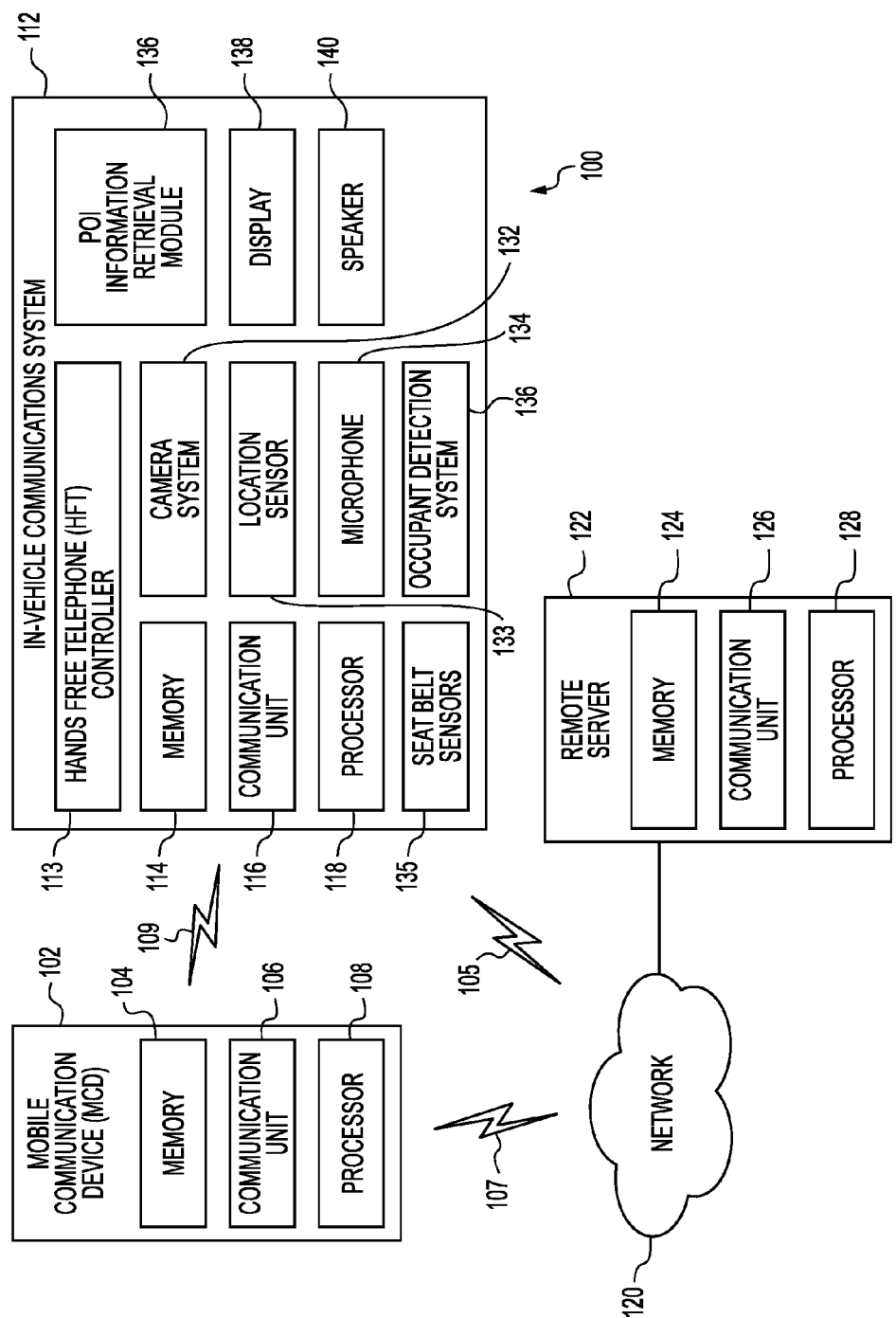
FIG. 1 illustrated an exemplary operating embodiment of the system.

FIG. 1 illustrates an exemplary operating environment 100 for various embodiments. The operating environment 100 may include an in-vehicle communications system 112. One example of such a system is an in-vehicle hands free telephone (HFT) controller 113 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and the wireless mobile communication device 102, a wireless networking communication link 107 between the wireless mobile communication device 102 and the network 120, and a POI data server 122 connected to the network 120. The communication links described herein can directly or indirectly connect these devices. The network 120 can be a wireless communication network such as a cellular network comprised of multiple base stations, controllers, and a core network that typically includes multiple switching entities and gateways, for example.

The functions described herein are set forth as being performed by a device in the operating environment 100 (e.g., the in-vehicle communication system 112, the MCD 102, and/or the remote server 122). In embodiments, these functions can be performed in any of these devices or in any combination of these devices and/or other devices.

The operating environment 100 includes input devices, such as a camera system 132, location sensors 133, a microphone 134, seat belt sensors 135, and occupant detection sensors 136. The camera system 132, location sensors 133, and/or microphone 134 can be part of the in-vehicle system 112 (as shown in FIG. 1) or can be in the MCD 102 (not shown), for example. In one embodiment, the camera system 132 includes a sensor that captures physical signals from within the vehicle (e.g., a time of flight camera, an infrared sensor, a traditional camera, etc). The camera system 132 is positioned to capture physical signals from a user such as hand or arm gestures from a driver or passenger, driver movement, head position, and driver gaze detection. The camera system 132 can include multiple cameras positioned to capture physical signals from various positions in the vehicle, e.g., driver seat, front passenger seat, second row seats, etc. Alternatively, the camera system 132 may be a single camera which is focused on one position (e.g., the driver), has a wide field of view, and can receive signals from more than one occupant of the vehicle, or can change its field of view to receive signals from different occupant positions. Seat belt sensors 135 and occupant detection sensors 136 are the type typically found in in-vehicle systems 122.

In another embodiment, the camera system 132 is part of the MCD 102 (e.g., a camera incorporated into a smart phone), and the MCD 102 can be positioned so that the camera system 132 captures gestures, including shrugged shoulders, driver movement, head position, and driver gaze performed by the occupant. For example, the camera system 132 can be mounted so that it faces the driver and can capture gestures by the driver. The camera system 132 may be positioned in the cabin or pointing toward the cabin and can be mounted on the ceiling, headrest, dashboard or other locations in/on the in-vehicle system 112 or MCD 102.

After capturing a physical signal, the camera system 132 outputs a data signal representing the physical signal. The format of the data signal may vary based on the type sensor(s) that were used to capture the physical signals. For example, if a traditional camera sensor was used to capture a visual representation of the physical signal, then the data signal may be an image or a sequence of images (e.g., a video). In embodiments where a different type of sensor is used, the data signal may be a more abstract or higher-level representation of the physical signal.

The location sensors 133 are physical sensors and communication devices that output data associated with the current location and orientation of the vehicle. For example, the location sensors 133 may include a device that receives signals from a global navigation satellite system (GNSS) or an electronic compass (e.g., a teslameter) that measures the orientation of the vehicle relative to the four cardinal directions. The location sensors 133 may also operate in conjunction with the communication unit 116 to receive location data associated with connected nodes in a cellular tower or wireless network. In another embodiment, some or all of the location sensors 133 may be incorporated into the MCD 102 instead of the vehicle.

The microphone 134 captures audio signals from inside the vehicle. In one embodiment, the microphone 134 can be positioned so that it is more sensitive to sound emanating from a particular position (e.g., the position of the driver) than other positions (e.g., other occupants). The microphone 134 can be a standard microphone that is incorporated into the vehicle, or it can be a microphone incorporated into the MCD 102. The microphone 134 can be mounted so that it captures voice signals from the driver. For example, the microphone 138 may be positioned in the cabin or pointing toward the cabin and can be mounted on the ceiling, headrest, dashboard or other locations in/on the vehicle or MCD 102.

The POI information retrieval module 136 retrieves information related to one or more POIs based on input from the camera system 132 and (optionally) the microphone 134. After performing the search, the module 136 sends the result to the display 138 and/or speaker 140 so that the result can be provided to the user. A detailed description of the components and operation of the POI information retrieval module 136 is presented below with reference to FIGS. 2-6.

The operating environment 100 also includes output devices, such as a display 138 and a speaker 140. The display 138 receives and displays a video signal. The display 138 may be incorporated into the vehicle (e.g., an LCD screen in the central console, a HUD on the windshield), or it may be part of the MCD 102 (e.g., a touchscreen on a smartphone). The speaker 140 receives and plays back an audio signal. Similar to the display 138, the speaker 140 may be incorporated into the vehicle, or it can be a speaker incorporated into the MCD 102.

The in-vehicle hands-free telephone (HFT) controller 113 and wireless mobile communication device (MCD) 102 may communicate with each other via a short-range communication link 109 which uses short-range communication technology, such as, for example, Bluetooth™ technology or other short-range communication technology, for example, Universal Serial Bus (USB). The HFT controller 113 and mobile communications device 102 may connect, or pair, with each other via short-range communication link 109. In an embodiment the vehicle 113 can include a communications unit 116 that interacts with the HFT controller 113 to engage in the short range communications, a memory unit device 114, and a processor 118. The HFT controller 113 can be part of a vehicle's telematics system which includes memory/storage, processor(s) and communication unit(s). The HFT controller 113 can utilize the vehicle's telematics unit to assist in performing various functions. For example, the communications unit 116 and/or processor 118 can be part of the vehicle's telematics unit or can be a separate unit in the vehicle.

The processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in each device in FIG. 1, multiple processors may be included in each device. The processors can comprise an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. The MCD 102 includes a communications unit 106, a memory unit device 104, and a processor 108. The MCD 102 also includes an operating system and can include various applications either integrated into the operating system or stored in memory/storage 104 and executed by the processor 108. In a common form, an MCD application can be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry™ devices, available from Research In Motion Ltd., Waterloo, Ontario, Canada, and/or applications available for Windows Mobile™ devices, available from Microsoft Corp., Redmond, Wash.

In alternate embodiments, the mobile communication device 102 can be used in conjunction with a communication device embedded in the vehicle, such as a vehicle-embedded phone, a wireless network card, or other device (e.g., a Wi-Fi capable device). For ease of discussion, the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

The mobile communication device 102 and the in-vehicle system 112 may exchange information via short-range communication link 109. The mobile communication device 102 may store information received from the in-vehicle system 112, and/or may provide the information (such as voice and/or gesture signals) to a remote processing device, such as, for example, the remote server 122, via the network 120.

The remote server 122 can include a communications unit 126 to connect to the network 120, for example, a memory/storage unit 124 and a processor 128.

In some embodiments, the in-vehicle system 112 may provide information to the mobile communication device 102. The mobile communication device 102 may use that information to obtain additional information from the network 120 and/or the server 122. The additional information may also be obtained in response to providing information with respect to a prompt on wireless mobile communication device 102 from in-vehicle system 112.

The network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Performing Distracted or Confused Driver Point of Interest Searches

Figure 2:
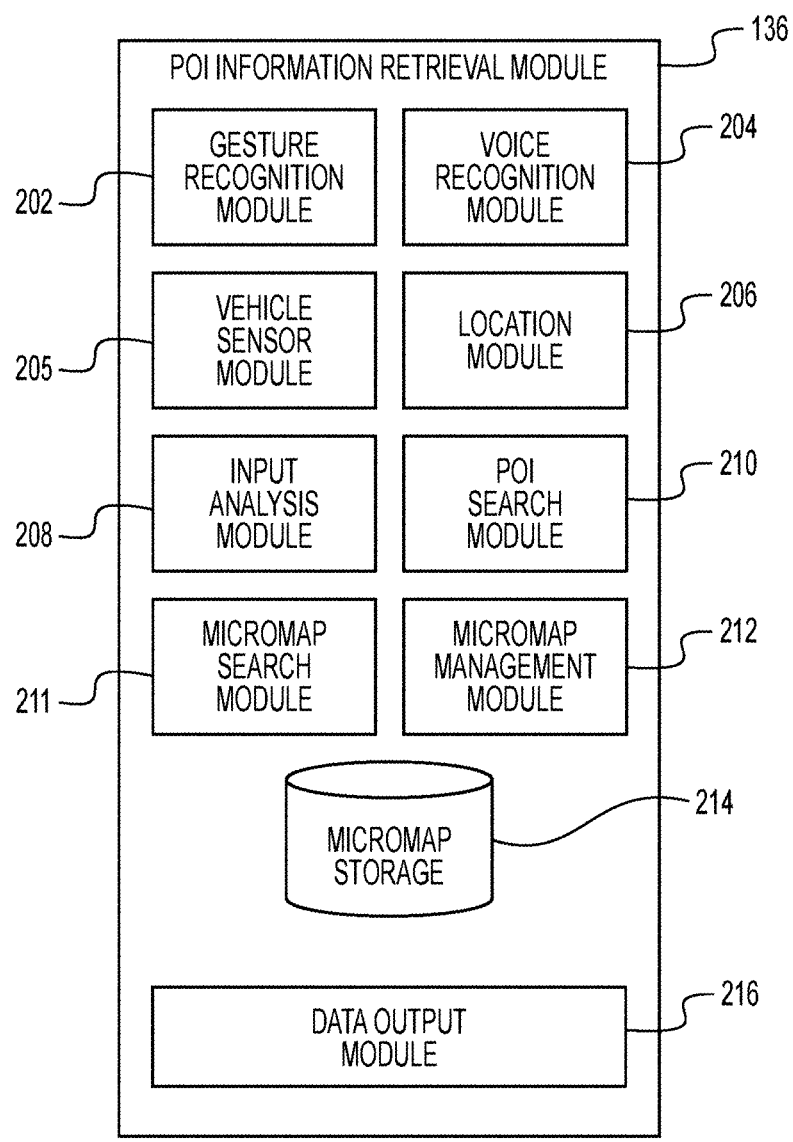
FIG. 2 illustrates a block diagram of a POI retrieval module.

FIG. 2 is a high-level block diagram illustrating components of the POI information retrieval module 136 of FIG. 1, according to one embodiment. The POI information retrieval module 136 includes a gesture recognition module 202, a location module 204, a vehicle sensor module 205, a voice recognition module 206, and input analysis module 208, a POI search module 210, a micromap management module 212, micromap storage 214, and an information output module 216. In alternative embodiments, the POI information retrieval module 136 may include additional, fewer, or different components, and the functionality of the components 202 through 216 described herein may be distributed among components of the information retrieval module 136 in a different manner.

The gesture recognition module 202 receives a data signal from the camera system 132 and performs a gesture recognition algorithm on the received data signal to identify and interpret the gesture that was captured by the camera system 132. As described above with reference to the camera system 132, the data signal is an electronic representation of a gesture that the user performed in the vehicle. For example, the data signal may be an image of the gesture, a sequence of images, or some other representation of the gesture. In one embodiment, the gesture recognition module 202 is configured to automatically detect an identifying gesture that identifies driver cues such as shrugged shoulders, forward lean, quickly turning heads, or other signs of a confused driver in the vehicle.

The voice recognition module 204 receives an output signal from the microphone 134 and performs a voice recognition algorithm on the received signal to identify voice commands, cues, or prompts received by the microphone 134. The voice recognition module 204 generates a computer-readable output representing words in the voice command. For example, the voice recognition module 204 may output the words as a character string.

The vehicle sensor module 205 receives output signals from various in-vehicle systems, such as seat belt tension sensors or occupant detection sensors in the seats. The vehicle sensor module 203 generates a signal to indicate that the driver is leaning forward or frequently moving or rocking in the seat, which are signs that may indicate the driver is confused or having difficulty locating or identifying a point of interest.

The location module 206 receives data from the location sensors 133 and uses the data to determine the current location and orientation of the vehicle. If the location module 206 receives multiple types of data for determining the vehicle's current location (e.g., a combination of GNSS data and location data for connected cell towers), then the module 206 may perform averaging or some other aggregation technique to combine the data into a single location (e.g., a single set of lat/long coordinates). The location module 206 may similarly perform aggregation to combine multiple types of orientation data.

The input analysis module 208 receives input data from the gesture recognition module 202, the voice recognition module 204, the vehicle sensor module 205, and the location module 206 and analyzes the input data to determine a target region corresponding to POIs of potential interest to the user. After determining the target region, the input analysis module 208 queries the POI search module 210 and/or the micromap search module 211 to retrieve information related to points of interest inside the target region. The operation of the input analysis module 208 is described below in greater detail.

The POI search module 210 receives a target region from the input analysis module 208 and performs a point of interest search in the target region by querying a remote server. In addition to the target region, the POI search module 210 may also receive character strings representing voice commands, cues, or prompts issued by the user. In this case, the POI search module 210 may include the character strings in the query in order to obtain more accurate results. To perform the search, the POI search module 210 may access a database on the server 122. Alternatively, the module 210 may access a service operating on a third-party server (e.g., Yelp™, Google Local).

The micromap search module 211 receives a target region from the input analysis module 208 and searches a corresponding micromap in the micromap storage 214 for information related to POIs in the target region. As used herein, a micromap is a map of a region that contains one or more POIs. Each micromap also includes information related to the POIs in the micromapped region. Since micromaps are stored locally in the micromap storage 214 in some embodiments, POI information that is stored in a micromap can be accessed with less latency than POI information that is retrieved from a remote server (e.g., by the POI search module 210). This can be particularly beneficial in regions with a high density of POIs, such as a downtown region in a major city.

The micromap management module 212 retrieves micromaps of regions that the vehicle is likely to enter and stores the retrieved micromaps in the micromap storage. In one embodiment, the micromap management module 212 monitors the location, orientation, and speed of the vehicle to automatically identify micromaps for retrieval. An example process for automatically identifying micromaps in this manner is described in detail with reference to FIG. 5.

The data output module 216 receives information related to one or more POIs from one of the search modules 210, 211 and sends the information to the display 138, the speaker 140, or some other output device in the MCD 102 or the in-vehicle communications system 112. In one embodiment, the data output module 216 sends an audio representation of a portion of the information for a point of interest while showing additional information to the user via the display 138. For example, if the data output module 216 receives information related to a restaurant, the module 216 may have the speaker 140 speak out the name of the restaurant while reviews of the restaurant are sent to the display 138.

In other embodiments, some or all of the components 202 through 216 of the POI information retrieval module 136 are positioned external to the in-vehicle system 112. In one embodiment, the components 202 through 216 are implemented as an application downloaded to the MCD 102 (e.g., applications available from iTunes). In another embodiment, the components 202 through 216 are implemented on the remote server 122, and data from the camera system 132, location sensors 133, and microphone 134 are sent over the network 120 to the remote server 122 to be analyzed.

Figure 3:
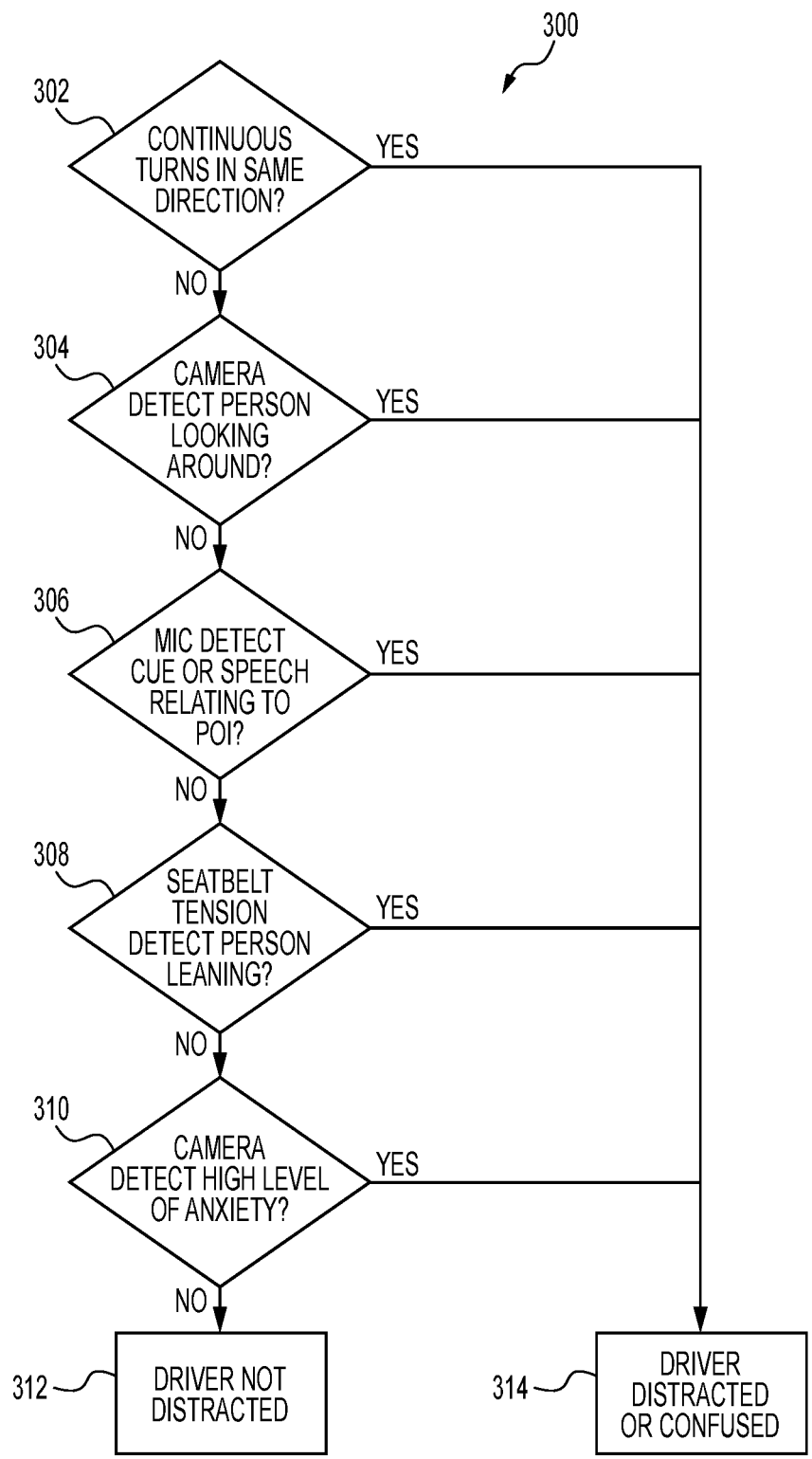
FIG. 3 is a flow chart depicting the process of determining whether a driver is distracted or confused.

FIG. 3 is a flow chart illustrating a process for detecting a distracted or confused driver, according to one embodiment. The process 300 begins when the vehicle identifies that the driver is distressed or confused inside the vehicle. Confusion can be determined in different ways by the system. For example, when the user is leaning over a lot, looking over their shoulder, as detected by vehicle cameras, the user can be determined to be confused. User confusion can also be detected by sensors such as seat belt tension sensors. Other vehicle systems that can be used to detect confusion include identification of frequent lane changes by the lane assist system, decreased speed, and generally the lack of attention as determined by camera systems. Forward collision warning systems may also be monitored as well. If the user is tending to more closely follow people, this tendency may suggest user confusion. Another factor that may indicate confusion is frequently checking of side and rear view systems, such as mirrors, lane watch, or other side and rear view camera systems more than a predetermined threshold of times as determined by vehicle camera systems. The identifying cues for confusion are typically directed toward the exterior to the vehicle to indicate that the user is attempting to identify an object outside the vehicle and request information about the object. For example, if the user is performing an identifying cue, such as shrugging shoulders, in attempting to identify to identify a building near the vehicle, the seat belt sensors 135 captures 308 the identifying gesture and sends a data signal representing the gesture to the vehicle sensor module 205.

With FIG. 3, the first step 302 of detecting a distracted or confused driver is determining whether the vehicle is making a number of continuous turns in the same direction, indicating driving around a block, decreased speed, and closely following another vehicle. If this condition is detected, the system may determine the driver is confused 314, or continue to additional steps if the condition is not satisfied. Next the vehicle may use the camera system 132 to detect whether the user is looking around, side-to-side as the next step 304. The microphone may also detect utterances by the user related to POI categories, such as parking, hotel, store, and the like in step 306. The seatbelt tension sensors 135 and occupant detection sensors 136 may indicate a driver moving around in step 308, and camera system 132 may detect high anxiety levels via infrared or thermal scans of the driver in step 310. A positive detection in any step may lead to a final output that the driver is distracted or confused 314.

Figure 4:
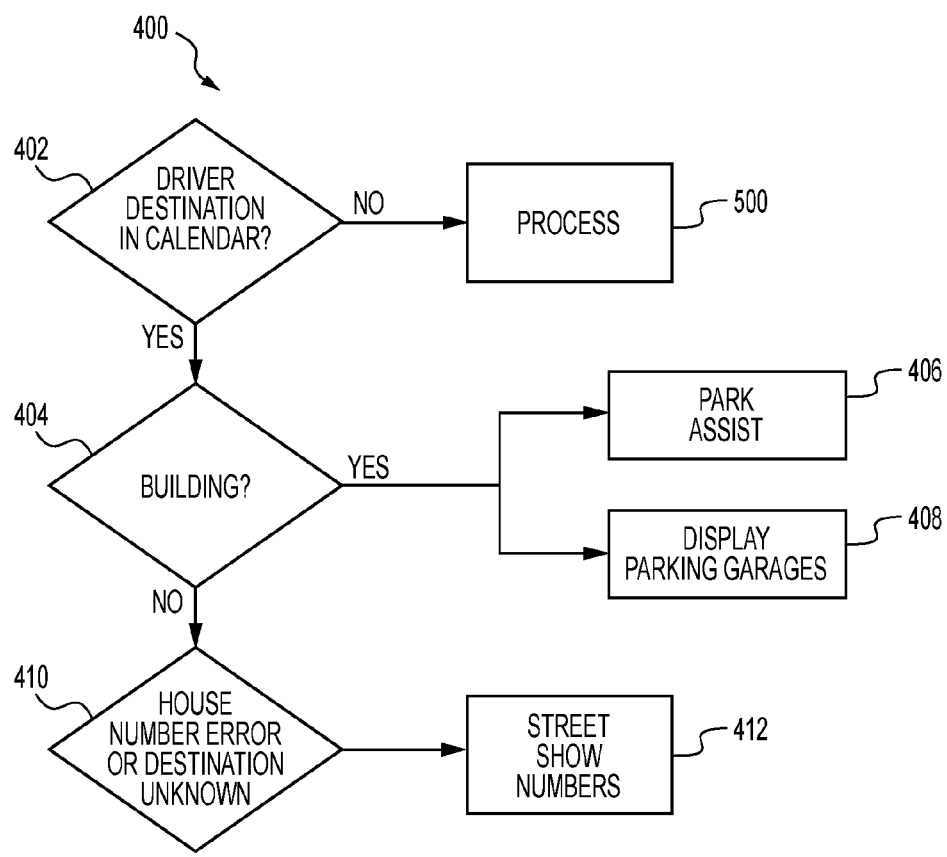
FIG. 4 is a flow chart depicting a process of what to do if the driver is distracted or confused.
Figure 5:
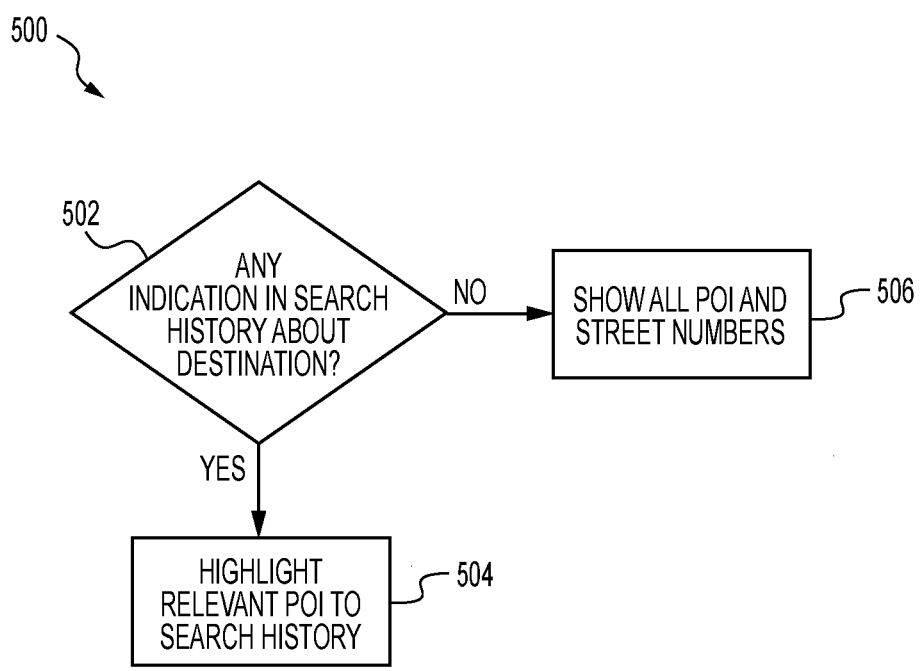
FIG. 5 is a flow chart depicting what to do if no driver destination is found in the process illustrated in FIG. 4.
Figure 6:
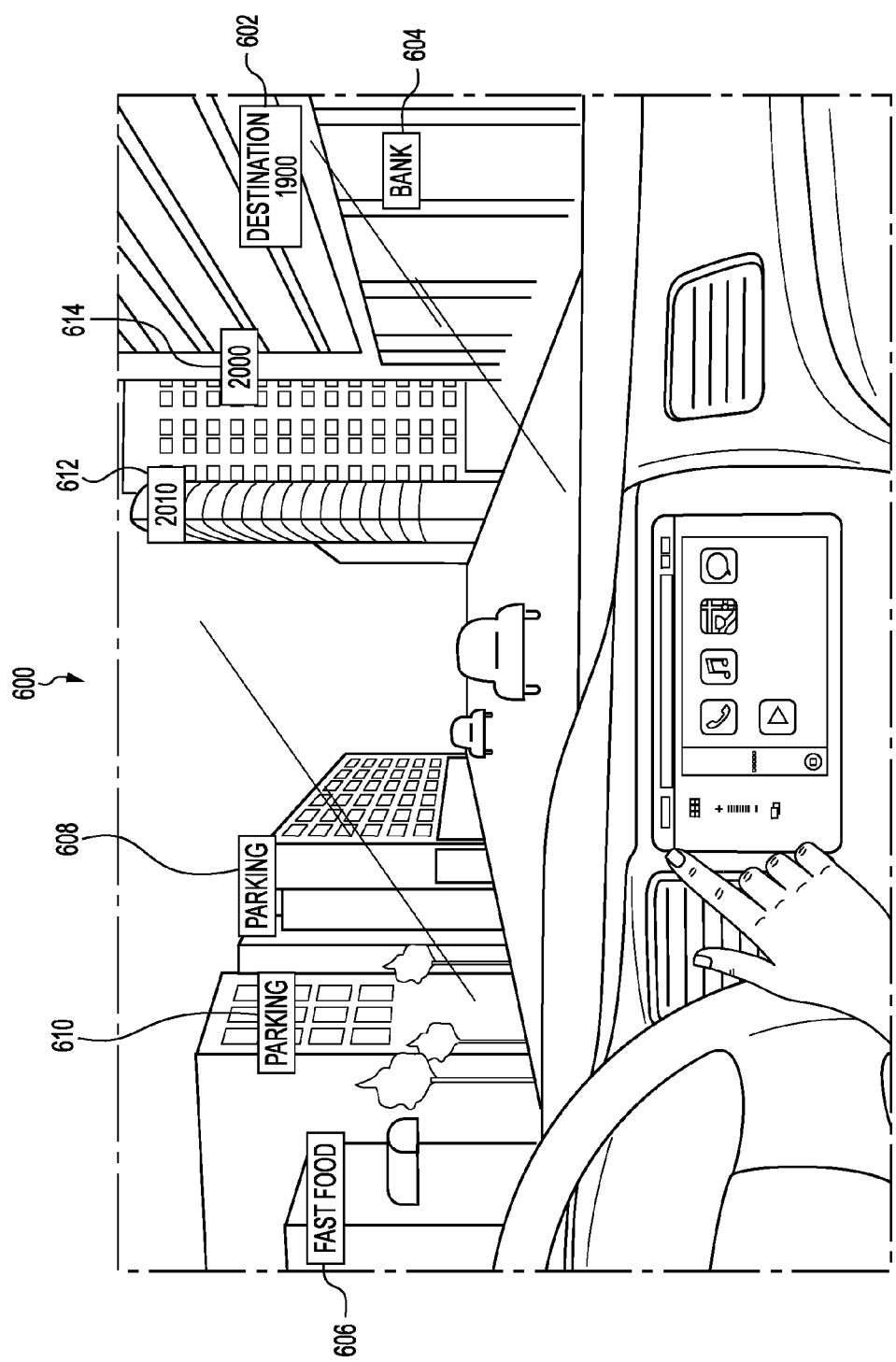
FIG. 6 illustrates the results of the process in FIG. 4 in a heads up display.

Once a distracted or confused driver is indicated, the process 400, illustrated in FIG. 4, indicates a search 402 may be made of the calendar on the user's mobile communication device for any inputs or destinations on the user's personal calendar or in the mobile communications devices search history. If a destination is found in step 404, a park assistant POI may be activated 406 to highlight available parking lots and nearby parking garages 408. Additionally, if an address number is found in step 410, address numbers may be shown or highlighted to ease identification of the destination for the user 412. In the event that no search history or specific calendar entry is found, process 500 is followed. A search may be completed of the user's search history in step 502, and if a search history exists, in step 504 all potentially relevant POIs may be displayed such as parking facilities, building numbers, and place of business signs based on data from the search history. If the search history is empty or unobtainable, in step 506, all POIs may be displayed such as parking facilities, building numbers, and place of business signs. FIG. 6 illustrates a representative display 600 showing a destination 602, POI locations such a bank 604 or restaurant 606, parking structures 608, 610, and street numbers 612, 614.

The user may optionally issue an audible command or cue to provide additional information about the object being sought. In the example illustrated in FIG. 6, the user says "parking." A voice command may be particularly helpful in situations where the object being identified (e.g., a parking garage) is adjacent to a different type of object (e.g., a building). Although the user shown in FIG. 6 issues the voice command at the same time as he performs identifying gesture, the user may alternatively issue a voice command before or after detection of an identifying gesture.

If the microphone 134 captures a voice cue with the identifying gesture, then the voice recognition module 204 analyzes the voice cue to generate a computer-readable representation of the command. In the example of FIG. 4A, the voice recognition module 204 generates the character string "parking" after receiving the corresponding audio signal from the microphone 134.

Meanwhile, the location module 206 receives data from the location sensors 133 to determine 306 the current location and orientation of the vehicle. In one embodiment, the location module 206 polls the location sensors 133 to determine a current location and orientation only after detecting that the user has performed an identifying gesture. In another embodiment, the location module 206 polls the location sensors 133 at regular intervals to maintain a constantly updated location and orientation for the vehicle.

Next, the input analysis module 208 receives the direction vector and the current location and orientation of the vehicle and generates 308 a target region that is likely to contain the object that the user is seeking. Alternatively, the target region may be some other shape that corresponds to the direction vector. In one embodiment, the input analysis module 208 also uses the current speed of the vehicle when determining the target region. For example, the target region can extend farther from the vehicle when the vehicle is traveling at a faster speed.

After generating the target region, the input analysis module 208 accesses the micromap storage 214 to determine whether the target region overlaps with any micromaps that have been stored in the micromap storage 214. If the target region does not overlap with any micromapped regions, then the input analysis module 208 sends the target region to the POI search module 210, and the POI search module 210 performs a search to retrieve 312 information for the POI that was identified with the identifying gesture. As described above with reference to FIG. 2, the POI search module 210 may access the remote server 122 or a third-party service (e.g., Yelp™, Google Local) to perform a POI search in the target region. The POI information may include, for example, a name for the POI, a short description, images, hours of operation, contract information, ratings and reviews, and other information.

If a voice command was received with the gesture, then the input analysis module 208 also passes a character string representing the voice command to the POI search module 210 so that the character string can be used to narrow the results of the POI search. For example, the POI search module 210 would perform a search for the term "parking" within the target region.

Since the user typically performs the identifying gesture with the intention of retrieving information about a single POI, the input analysis module 208 may use an iterative process to adjust the target region until the POI search module 210 returns a single POI. For example, a triangular target region. Thus, if the POI search finds multiple POIs, the input analysis module 208 may iteratively decrease the size of the target region until one POI is found. Similarly, if the search does not return any POIs, the input analysis module 208 may iteratively increase the size of the target region until a POI is returned. The single POI is then sent to the data output module 216 to be provided to the user. Alternatively, the input analysis module 208 may merely use the iterative process to reduce the number of POIs but still send multiple POIs to the data output module 208. This may be useful in cases where there is uncertainty over which POI the user was attempting to find.

If the input analysis module 208 determines that the target region overlaps with a micromapped region, then the input analysis module 208 sends the target region to the micromap management module 212 so that the micromap search module 211 can search the corresponding micromap to retrieve POI information for the identified POI. The input analysis module 208 and the micromap search module 211 may operate in conjunction to perform an iterative process similar to the process described above with reference to the POI search module 210 to narrow the POI information that is sent to the data output module 216. Since the micromap is stored locally, the iterative process can be performed more quickly. In addition, the micromap search module 211 can advantageously perform a search in a locally stored micromap in situations where the communication links 105, 107 to the network 120 are unreliable or unavailable. Micromaps are also advantageous because they provide increased granularity in identifying and localizing POIs, and such POIs may reference various types of establishments. With localization, micromapping also enables more accurate reconstruction. In one embodiment, the range of reconstruction is limited to the range of micromapped objects. Hence, using a micromap may also change the range and overall number of accessible POIs. In one embodiment, the input analysis module 208 retrieves POI information from both search modules 210, 211 in parallel and merges the two sets of retrieved POI information into a single set of results. For example, the input analysis module 208 uses an artificial intelligence unit to merge the retrieved POI information.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer-implemented method of providing enhanced navigation information from a navigation system in a vehicle in response to a finding of driver confusion, comprising the steps of:
    monitoring behavior of a driver using an input device in the vehicle;
    determining whether the driver is confused using a processor in the vehicle based on the behavior of the driver;
    providing additional points of interest data to the driver using a display in the vehicle if the driver is determined to be confused.

2. The method of claim 1 wherein the step of monitoring behavior of the driver further comprises the step of:
    monitoring gaze of the driver using an in-vehicle camera.

3. The method of claim 2 wherein the step of determining whether the driver is confused based on the behavior of the driver further comprises the step of:
    determining the driver is looking over a shoulder more than a threshold number of times in a specified time period as detected by the in-vehicle camera.

4. The method of claim 2 wherein the step of determining whether the driver is confused based on the behavior of the driver further comprises the step of:
    determining the driver is checking a side view system and a rear-view system more than a threshold number of times in a specified time period as detected by the in-vehicle camera.

5. The method of claim 1 wherein the step of monitoring behavior of the driver further comprises the step of:
    monitoring tension of a seat belt in the vehicle.

6. The method of claim 5 wherein the step of determining whether the driver is confused based on the behavior of the driver further comprises the step of:
    determining whether the driver is rocking as detected by tension in the seat belt exceeding a threshold more than a threshold number of times in a specified time period.

7. The method of claim 1 wherein the step of monitoring behavior of the driver further comprises the steps of:
    monitoring whether the vehicle is changing lanes on a road; and
    monitoring a velocity of the vehicle.

8. The method of claim 7 wherein the step of determining whether the driver is confused based on the behavior of the driver further comprises the step of:
    determining the driver is changing lanes more than a threshold number of times in a specified time period; and determining the driver is varying velocity of the vehicle more than a threshold number of times in a specified time period.

9. The method of claim 1 wherein the step of monitoring behavior of the driver further comprises the step of:
monitoring a forward collision warning system of the vehicle.

10. The method of claim 9 wherein the step of determining whether the driver is confused based on the behavior of the driver further comprises the step of:
determining the driver is closely following a second vehicle as determined by maintaining a distance between the vehicle and the second vehicle that is below a threshold distance for over a threshold amount of time.

11. The method of claim 1 wherein the step of providing additional points of interest data comprises the step of:
providing parking data; and
providing sign data for stores and buildings.

12. A system for providing enhanced navigation information in a vehicle to a driver in response to a finding of driver confusion, comprising:
a navigation system, the navigation system comprising:
a processor; and
a screen for displaying navigation information;
an in-vehicle camera, the in-vehicle camera monitoring the driver and providing driver behavior data to the navigation system;
wherein the navigation system determines whether the driver is confused based on the driver behavior data; and
wherein the navigation system provides additional points of interest data to the driver on the screen if the driver is determined to be confused, comprising
parking data; and
sign data for stores and buildings.

13. The system of claim 12 wherein in-vehicle camera detects and monitors gaze of the driver.

14. The system of claim 13 wherein the navigation system determines whether the driver is looking over a shoulder more than a threshold number of times in a specified time period as detected by the in-vehicle camera.

15. The system of claim 13 wherein the navigation system determines whether the driver is checking a side view system and a rear-view system more than a threshold number of times in a specified time period as detected by the in-vehicle camera.

16. A system for providing enhanced navigation information in a vehicle to a driver in response to a finding of driver confusion, comprising:
a navigation system, the navigation system comprising:
a processor; and
a screen for displaying navigation information;
a seat belt sensor for monitoring tension of the seat belt and providing driver behavior data to the navigation system;
wherein the navigation system determines whether the driver is confused based on the driver behavior data; and
wherein the navigation system provides additional points of interest data to the driver on the screen if the driver is determined to be confused, comprising
parking data; and
sign data for stores and buildings.

17. A system for providing enhanced navigation information in a vehicle to a driver in response to a finding of driver confusion, comprising:
a navigation system, the navigation system comprising:
a processor; and
a screen for displaying navigation information;
a lane monitoring system for determining whether the vehicle is maintained within a lane in a road and providing driver behavior data to the navigation system;
wherein the navigation system determines whether the driver is confused based on the driver behavior data; and
wherein the navigation system provides additional points of interest data to the driver on the screen if the driver is determined to be confused, comprising
parking data; and
sign data for stores and buildings.

18. The system of claim 17 wherein the navigation system determines whether the driver is confused by determining the driver is changing lanes more than a threshold number of times in a specified time period and determining the driver is varying velocity of the vehicle more than a threshold number of times in a specified time period.

19. A system for providing enhanced navigation information in a vehicle to a driver in response to a finding of driver confusion, comprising:
a navigation system, the navigation system comprising:
a processor; and
a screen for displaying navigation information;
a forward collision warning system of the vehicle providing driver behavior data to the navigation system;
wherein the navigation system determines whether the driver is confused based on the driver behavior data; and
wherein the navigation system provides additional points of interest data to the driver on the screen if the driver is determined to be confused, comprising
parking data; and
sign data for stores and buildings.

* * * * *